United States Patent
Field et al.

(10) Patent No.: US 6,651,042 B1
(45) Date of Patent: Nov. 18, 2003

(54) SYSTEM AND METHOD FOR AUTOMATIC VOICE MESSAGE PROCESSING

(75) Inventors: Graham Ashley Field, Kimpton Down (GB); Robert James Mann, West Wellow (GB)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 09/653,342

(22) Filed: Aug. 31, 2000

(30) Foreign Application Priority Data

Jun. 2, 2000 (GB) .............................................. 0013311

(51) Int. Cl.$^7$ .............................................. G10L 15/00
(52) U.S. Cl. ...................... 704/270; 704/235; 704/260; 379/100.05; 725/116
(58) Field of Search .............................. 704/270, 270.1, 704/275, 260, 235; 379/88, 88.01, 88.02, 100.05, 88.16; 725/116, 129; 455/344, 351; 340/7.53, 7.63

(56) References Cited

U.S. PATENT DOCUMENTS

| | | | |
|---|---|---|---|
| 5,159,713 A | * 10/1992 | Gaskill et al. ............... | 455/344 |
| 5,479,491 A | 12/1995 | Herrero Garcia et al. ..... | 379/88 |
| 5,528,739 A | 6/1996 | Lucas et al. ................. | 395/145 |
| 5,682,421 A | * 10/1997 | Glovitz et al. ......... | 379/100.05 |
| 5,754,938 A | * 5/1998 | Herz et al. .................... | 725/116 |
| 5,948,058 A | 9/1999 | Kudoh et al. ................ | 709/206 |
| 5,956,681 A | 9/1999 | Yamakita .................... | 704/260 |

FOREIGN PATENT DOCUMENTS

| | | | |
|---|---|---|---|
| EP | 0 903 918 | 3/1999 | |
| EP | 0 935 378 | 8/1999 | |
| EP | 0935378 | 8/1999 | ............ H04M/3/42 |
| EP | 1058445 | 12/2000 | .......... H04M/3/533 |
| GB | 2331201 | 5/1999 | ............ H04M/3/50 |
| GB | 2 334 404 | 8/1999 | |
| GB | 2334404 | 8/1999 | ............ H04M/3/50 |
| JP | 11187117 | 7/1999 | ............ H04M/1/65 |

OTHER PUBLICATIONS

Corepoint Mail Analyzer for Windows NT and AIX "General Information Manual", Version 6.2, second edition, Aug. 3, 1999.
"Vector–based Natural Language Call Routing", Jennifer Chu–Carroll & Bob Carpenter, vol. 25, No 3, pp 361–388, 1999.
Computational Linguistics internet address http://mitpress.mit.edu/journal–issue–abstracts.tcl?issn=08912017&volume=25&issue=3, Sep. 1999, Functional Centering—Grounding Referential Coherence in Information Structure by Michael Strube & Udo Hahn, "The Computational Complexity of The Correct–Prefix Property for TAGs" by Mark–Jan Nederhof, "Vector–based Natural Language Call Routing" by Jennifer Chu–Carroll and Bob Carpenter and "Interpreting and Generating Indirect Answers" by Nancy Green and Sandra Carberry.

* cited by examiner

Primary Examiner—David D. Knepper
(74) Attorney, Agent, or Firm—Akerman Senterfitt

(57) ABSTRACT

The present invention relates to a system and methods for automatic voice message processing and in particular to a system and method for processing voice messages to convert the voice mail to email and prioritise the e-mail according to acoustic features in the voice mail. Performing speech to text conversion on a voice message and then categorising the text has its problems. A keyword for the categorisation may not be present in the text if the speaker was in too much of a hurry when leaving a message, for instance if it was urgent or important. If the speaker talked too quickly or does not match the speech pattern word vocabulary then the keyword may not be recognised. It is not known to categorise a voice message based on the way in which a voice message is spoken or delivered by a caller.

15 Claims, 3 Drawing Sheets

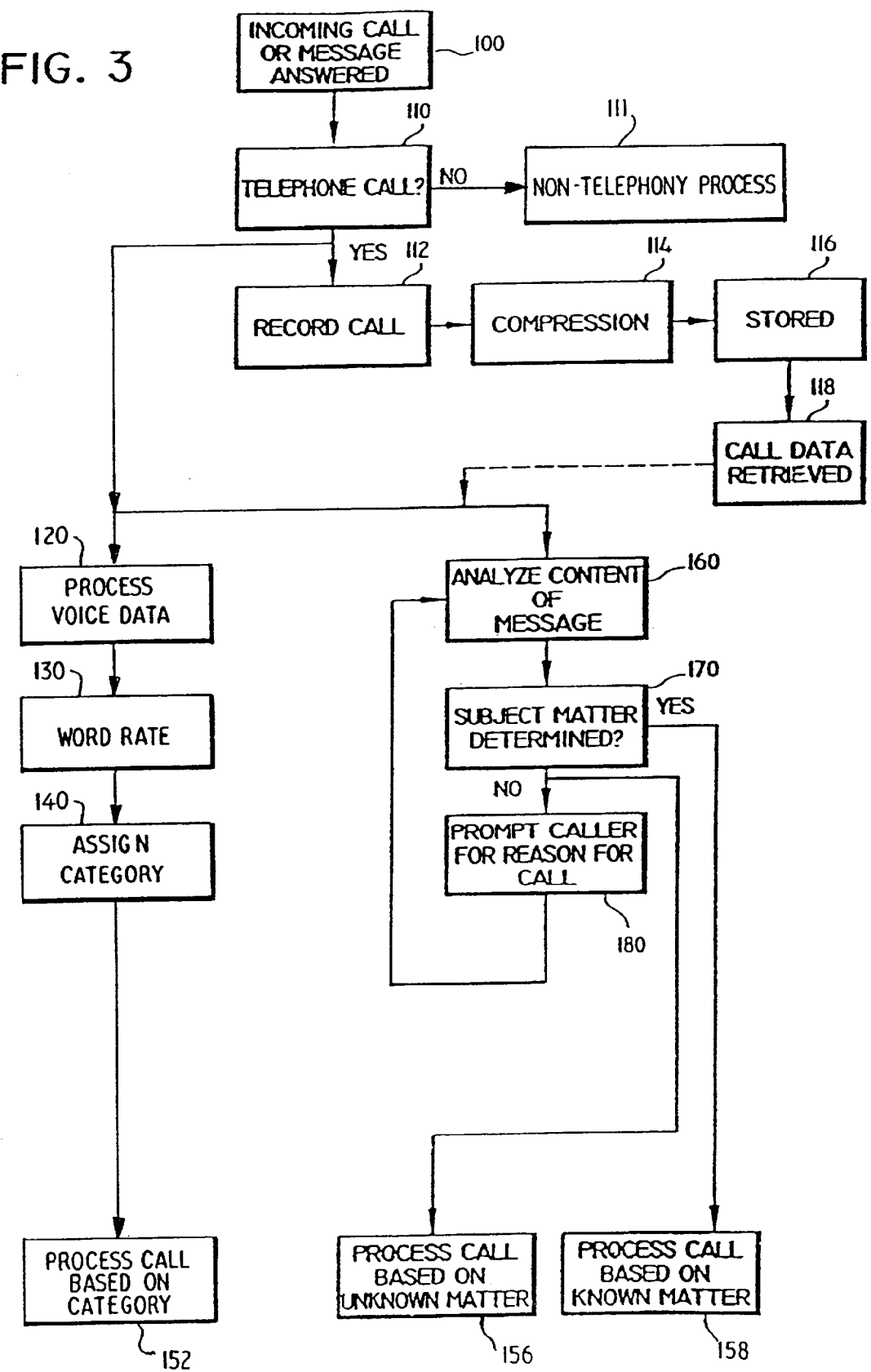

SYSTEM AND METHOD FOR AUTOMATIC VOICE MESSAGE PROCESSING

FIELD OF THE INVENTION

The present invention relates to a system and methods for automatic voice message processing and in particular to a system and method for processing voice messages so as to convert the voice mail to e-mail and prioritise the e-mail according to acoustic features in the voice mail.

BACKGROUND OF THE INVENTION

It is known to categorise an e-mail according to keywords recognised from the text of the e-mail. The e-mail may then be displayed in specific categories within an e-mail inbox. This way a receiver can see which emails are urgent, important, or confidential at first glance and prioritise subsequent reading and actions accordingly.

It is also known for a telephony system to perform voice recognition translation on the voice signal and analyse the translated text for the purpose of categorising the voice message.

European Patent publication number 0935378 discloses a programmable automatic call and data transfer processing system which indexes or prioritises incoming telephone calls, facsimiles and emails based on the identity of the caller or author, the subject matter of the message or request, and/or the time of day. Such a system is embodied in IBM Mail Analyzer which is intended to interface with an e-mail system (such as Lotus Notes) that processes text-based documents and provides text categorisation technology. IBM Mail Analyzer is part of a suite of software focusing on customer relationship management which also includes IBM DirectTalk interactive voice recognition system, IBM DirectTalkMail voice messaging system, and IBM CallPath telephone call centre system.

Performing speech to text conversion on a voice message and then categorising the text has its problems. A keyword for the categorisation may not be present in the text if the speaker was in too much of a hurry when leaving a message, for instance if it was urgent or important. If the speaker talked too quickly or does not match the speech pattern word vocabulary then the keyword may not be recognised.

DISCLOSURE OF THE INVENTION

According to one aspect of the invention there is provided a method of processing a voice message within a voice message system comprising: receiving a voice message; determining a characteristic associated with the acoustic delivery of the voice message; determining a category based on characteristic; associating the category with the voice message; and prioritising the voice message along with other similarly categorised voice messages according to their respective categories.

It is not known to categorise a voice message based on the way in which a voice message is spoken or delivered by a caller. Normally the categorisation is determined by the content of the voice message. Although the prior art does use acoustic properties to finally determine the text on which the prior art categorisation is performed it is the text on which the categorisation is ultimately based and not on a property of the voice message itself. The text of the message is derived from a multistage process including: calculating the frequency of the nodes of the signal by sampling the signal; determining the phonemes from the nodes using frequency analysis; and determining the text from the phonemes using Hidden Markov Modelling. Finally the text of the message is scanned to acquire certain key words and the message is categorised according to the located keywords.

One such characteristic of delivery is the rate of delivery of the words in the voice message. A caller may leave a very hurried message because of the urgency or importance of the matter. The caller may forget to mention that the matter is urgent or important but will have left enough clues in the message for it to be categorised as such. The level of volume of the message is another characteristic. A stressed or irate caller may raise his voice when leaving a message and such a characteristic can be used to categorise the message as important or urgent.

The rate of delivery of the message is the number of words in the message divided by the time taken to speak the message. The number of words is determined by counting the number of unvoiced segments in the voice signal. Alternatively, if the message is converted into text the number of words may be counted from the text. The voice message may be timed by the IVR system to find its length (in seconds) or alternatively the size of the message is taken to be in proportion to time needed to record it and an appropriate algorithm calculates this. The size of the message can be determined from the number of data words needed to store it.

Preferably the method further comprises: storing the voice message and category in a group with other voice messages and categories; and defining a play order for the group of voice mail messages depending on their respective associated categories. In this way voice messages which were deemed urgent would be played first instead of playing the voice messages in received order.

The method may advantageously be combined with e-mail messages whereby notification of the categorised voice message is sent to an e-mail system or other messaging system and the notification is prioritised with similarly categorised mails. More advantageously the voice message is converted into a text message and sent as a complete e-mail with associated category whereby the converted voice message is prioritised with similarly categorised e-mails.

Advantageously the characteristic is representative of the urgency of the message and the voice message is categorised according to the urgency as determined from the acoustic characteristic.

Alternatively the characteristic is representative of the importance of the message and the voice message is categorised according to the importance of the message.

The characteristic may be representative for the whole voice message or part of a message. For instance the speed of delivery may be estimated from the first part of the voice message rather than the whole message.

BRIEF DESCRIPTION OF THE DRAWINGS

FIG. 3 is a flow diagram illustrating a method for call or data transfer processing in accordance with the present invention.

DETAILED DESCRIPTION OF PREFERRED EMBODIMENTS

Figure 1:
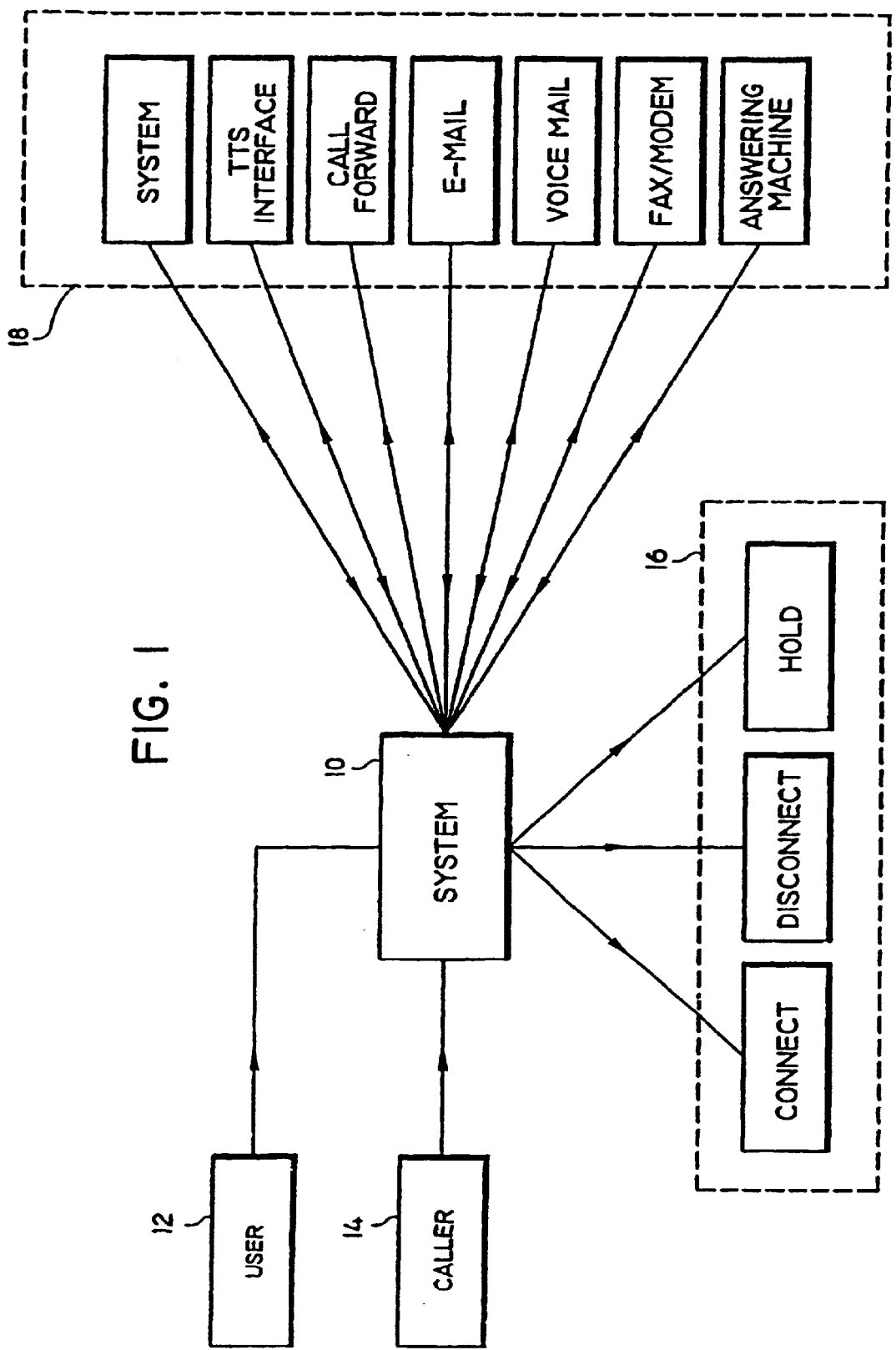
FIG. 1 is a block diagram illustrating general functions of an automatic call and data transfer processing system in accordance with the present invention.

Referring to FIG. 1, a block diagram illustrating general functions of an automatic call and data transfer processing system of the present invention is shown. The present invention is an automatic call and data transfer processing machine that can be programmed by an authorized user (block 12) to process incoming telephone calls in a manner pre-determined by such user. Although the present invention may be employed to process any voice data that may be received through digital or analog channels, one embodiment of the present invention involves the processing of telephone communications. Particularly, the system 10 will automatically answer an incoming telephone call from a caller (block 14) and, depending upon the manner in which the system 10 is programmed by the user (block 12), the system 10 may process the telephone call by, for example, switching the call to another telecommunication system or to an answering machine (Block 18), or by handling the call directly, e.g., by connecting, disconnecting or placing the caller on hold (Block 16). In addition, the system 10 may be programmed to route an incoming telephone call to various telecommunication systems in a specific order (e.g., directing the call to several pre-determined telephone numbers until such call is answered) or simultaneously to all such systems. It is to be understood that the telecommunication systems listed in block 18, as well as the options shown in block 16 of FIG. 1, are merely illustrative, and not exhaustive, of the processing procedures that the system 10 may be programmed to perform.

The functional modules of the system 10 and their specific interaction in accordance with an embodiment of the present invention will be explained below by reference to FIG. 2. It is to be understood that same or similar components illustrated throughout the figures are designated with the same reference numeral. It is to be further understood that the functional modules described herein in accordance with the present invention may be implemented in hardware, software, or a combination thereof. Preferably, the main speech and speaker recognition, language identification modules and indexing modules of present invention, for example, are implemented in software on one or more appropriately programmed general purpose digital computer or computers, each having a processor, associated memory and input/output interfaces for executing the elements of the present invention. It should be understood that while the invention is preferably implemented on a suitably programmed general purpose computer or computers, the functional elements of FIG. 2 may be considered to include a suitable and preferred processor architecture for practicing the invention and are exemplary of functional elements which may be implemented within such computer or computers through programming. Further, the functional elements of FIG. 2 may be implemented by programming one or more general purpose microprocessors. Of course, special purpose microprocessors may be employed to implement the invention. Given the teachings of the invention provided herein, one of ordinary skill in the related art will be able to contemplate these and similar implementations of the elements of the invention.

Figure 2:
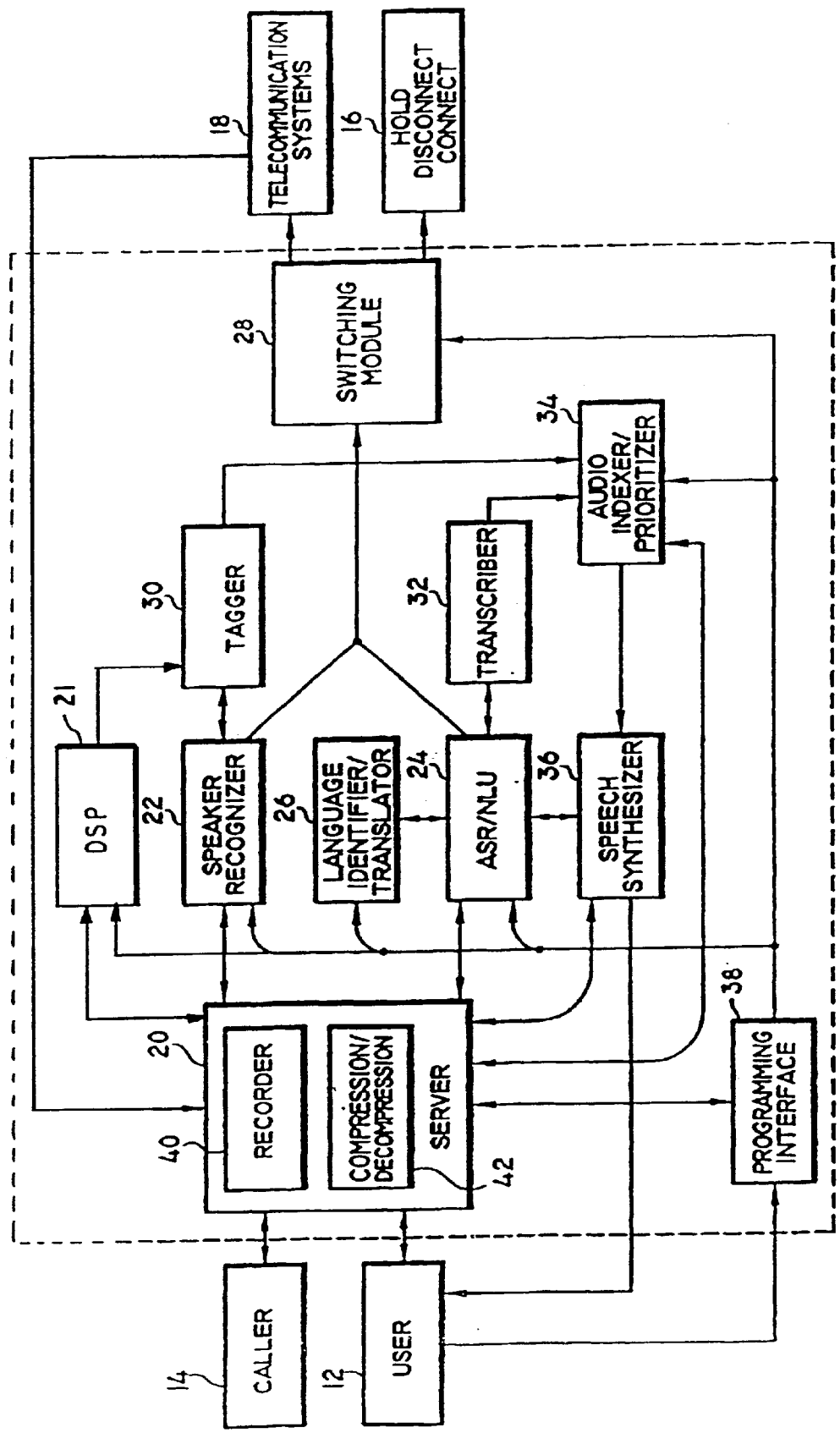
FIG. 2 is a block diagram, as well as a flow diagram, illustrating the functional interconnection between modules for a call and data transfer processing system in accordance with an embodiment of the present invention.

Referring now to FIG. 2, the system 10 includes a server 20 preferably connected to various telecommunication systems including, but not limited to, one or more telephone lines (block 14) and one or more facsimile and a modem lines (FIGS. 1 and 2, block 18) for receiving and sending telephone calls and message data, respectively. The server 20 is programmed to automatically answer incoming telephone calls and receive incoming facsimile transmissions. The system 10 may also include a permanent internet/intranet connection for accessing a local network mail server, whereby the server 20 can be programmed to periodically connect to such local network mail server (via TCP/IP) to receive and process incoming e-mails, as well as send e-mail messages. Alternatively, if the system 10 is not permanently connected to a local network server, the system server 20 may be programmed to periodically dial an access number to an internet provider to retrieve or send e-mail messages. Such procedures may also be performed at the option of the user (as opposed to automatically monitoring such e-mail accounts) when the user accesses the system 10.

Further, as shown in FIGS. 1 and 2 (block 18), the server 20 may be directly connected to voice mail systems and answering machines so as to allow the user to retrieve and process messages that have been recorded on such voicemail and answering machine systems. If the system 10 is connected to a local network system, the server 20 may be programmed to periodically retrieve messages from other voice mail systems or answering machines which are not directly connected to the server 20, but otherwise accessible through the local network, so that the system 10 can then automatically monitor and retrieve messages from such voice mail systems or answering machines.

The server 20 includes a recorder 40 for recording and storing audio data (e.g., incoming telephone calls or messages retrieved from voice mail or answering machines), preferably in digital form. Furthermore, the server 20 preferably includes a compression/decompression module 42 for compressing the digitized audio data, as well as message data received via e-mail and facsimile, so as to increase the effective data storage capability of a memory (not shown) of the system 10 and for decompressing such data before reconstruction when such data is retrieved from memory.

A digital signal processor (DSP) 21, a speaker recognizer module 22 and an automatic speech recognizer/natural language understanding (ASR/NLU) module 24 are operatively coupled to the server 20. The DSP 21 performs analysis on the call using a pre-programmed algorithm to determine a pre-determined characteristic of the call. The DSP 21 in the preferred embodiment is operatively connected to the server 20, a programming interface 38 and a tagger 30. The server 20 feeds the message signal to the DSP 21. The programming interface 38 allows a user to change and adapt the algorithm within the DSP 21. The tagger 30 accepts the results of the processing from the DSP 21 as input. The algorithm is programmed to calculate the word rate of the telephone call and assign a category to the message according to whether this rate is above or below a threshold value. Typically a non-rushed voice message is three words per sec whereas a rushed voice message is four words per second. For this embodiment the threshold value is three and a half but it is possible for a user to change this value through the programming interface 38.

The speaker recognizer module 22 determines the identity of the caller 14 and participants to a conference call from the voice data received by the server 20, as well as the author of a received facsimile or e-mail message. The ASR/NLU module 24 converts voice data and other message data received from the server 20 into readable text to determine the content and subject matter of such calls, conversations or messages. In addition, as further demonstrated below, the ASR/NLU module 24 processes verbal commands from an authorized user to remotely program the system 10, as well as to generate or retrieve messages. The ASR/NLU module 24 also processes voice data from callers and authorized users to perform interactive voice response (IVR) functions. A language identifier/translator module 26, operatively connected to the ASR/NLU module 24, is provided so that the system 10 can understand and properly respond to messages in a foreign language when the system is used, for example, in a multi-language country such as Canada.

A switching module 28, operatively coupled to the speaker recognizer module 22 and the ASR/NLU module 24, processes data received by the speaker recognizer module 22 and/or the ASR/NLU module 24. The switching module performs a processing procedure with respect to incoming telephone calls or facsimile or e-mail messages (e.g., directing a call to voice-mail or answering machine) in accordance with a pre-programmed procedure.

The tagger module 30, operatively connected to the speaker recognizer module 22, and the DSP 21 is provided for electronically tagging the identity or categorisation of the caller to the caller's message or conversation or tagging the identity or categorisation of the author of an e-mail or facsimile message. Further, when operating in the background of a teleconference, the ID tagger 30 will tag the identity of the person currently speaking. A transcriber module 32, operatively connected to the ASR/NLU module 24, is provided for transcribing the telephone message or conversation, teleconference and/or facsimile message. In addition, the transcriber module 32 can transcribe a verbal message dictated by the user, which can subsequently be sent by the system 10 to another person via telephone, facsimile or e-mail.

An audio indexer/prioritizer module 34 is operatively connected to the ID tagger module 30 and the transcriber module 32. The audio indexer/prioritizer module 34 stores the transcription data and caller identification data which is processed by the transcriber module 32 and the ID tagger module 30, respectively, as well as the time of the call, the originating phone number (via automatic number identification (ANI) if available) and e-mail address, in a pre-programmed manner, so as to allow the user to retrieve specific calls or messages from a particular party or those calls or messages which pertain to specific subject matter. Further, the audio indexer/prioritizer can be programmed to prioritize certain calls or messages and inform the user of such calls or messages.

A speech synthesizer module 36, operatively connected to the audio indexer/prioritizer module 34, allows the user to retrieve messages (e-mails or facsimiles) in audio form (i.e., synthesized speech). The speech synthesizer is also operatively coupled to the ASR/NLU module for providing system prompts (i.e., queries) in the form of synthesized speech (as opposed to being displayed, for example, on a computer monitor).

The programming interface 38, operatively coupled to the server 20, speaker recognizer module 22, language identifier/translator module 26, ASR/NLU module 24, audio indexer/prioritizer module 34 and the switching module 28, is provided for programming the system 10 to process calls and messages in accordance with a pre-determined procedure. As explained in detail below, a user may program the system 10 using the programming interface 38 through either voice commands or a GUI (graphical user interface), or both. In a preferred embodiment, the system 10 is programmed by verbal commands from the user (i.e., voice command mode). Specifically, the user may program the system 10 with verbal commands either remotely, by calling into the system 10, or locally with a microphone. The programming interface 38 is connected to the server 20 which, in conjunction with the speaker recognizer module 22 and the ASR/NLU module 24, verifies the identity of the user before processing the verbal programming commands of the user. The system 10 may either display (via the GUI) or play back (via the speech synthesizer 36) information relating to the verbal programming commands (i.e., whether the system 10 recognizes such command), as well as the current programming structure of the system 10.

In another embodiment, the system 10 may be programmed locally, through a PC and GUI screen, or programmed remotely, by accessing the system 10 through a computer network from a remote location. Similar to a conventional windows interface, the user may program the system 10 by selecting certain fields which may be displayed on the GUI. It is to be appreciated that the system 10 may be programmed through a combination of voice commands and a GUI. In such a situation, the GUI may, for example, provide assistance to the user in giving the requisite voice commands to program the system 10. Still further, the system 10 may be programmed by editing a corresponding programming configuration file which controls the functional modules of FIG. 2.

The operation of the present invention will now be described with reference to FIG. 2 and FIG. 3. It is to be understood that the depiction of the present invention in FIG. 2 could be considered a flow chart for illustrating operations of the present invention, as well as a block diagram showing an embodiment of the present invention. The server 20 is programmed to automatically answer an incoming telephone call, e-mail, facsimile/modem, or other electronic voice or message data (step 100). The server 20 distinguishes between incoming telephone calls, e-mail messages, facsimile messages, etc., by special codes, i.e. protocols, at the beginning of each message which indicates the source. Particularly, the server 20 initially assumes that the incoming call is a telephone communication and will proceed accordingly (step 110)unless the server 20 receives, for example, a modem handshake signal, whereby the system 10 will handle the call as a computer connection protocol. It is to be understood that the system 10 may be programmed to monitor other voice mail or e-mail accounts by periodically calling and retrieving voice mail and e-mail messages from such accounts.

If it is determined that the incoming call received by the server 20 is a telephone call, the audio data (e.g., incoming calls as well as calls retrieved from voice mail or answering machines) is recorded by the recorder 40 (step 112). The recorder 40 may be any conventional device such as an analog recorder or digital audio tape ("DAT"). Preferably, the recorder 40 is a digital recorder, i.e., an analog-to-digital converter for converting the audio data into digital data. The digitized audio data may then be compressed by the compression/decompression module 42 (step 114) before being stored (step 116) in memory (not shown in FIG. 2). It is to be appreciated that any conventional algorithm, such as those disclosed in "Digital Signal Processing, Synthesis and Recognition" by S. Furui, Dekker, 1989, may be employed by the compression/decompression module 42 to process the message data.

The urgency of the call is calculated by the following method. The voice message is processed at step 120 to acquire the number of words in the voice message. The DSP 21 works in this embodiment by counting the non-voiced parts of the signal and assuming each of the non-voiced part to correspond to a word within the call. The time of the call is simultaneously measured by the DSP which is used to divide the number of words value to arrive (at step 130) at the words per second value. The word rate is compared in step 140 to the threshold value and a normal rate or urgent category assigned the message. The tagger 30 then labels (step 152) the message with the assigned category before the voice message is passed on to the audio indexer/prioritizer 34.

In an alternative embodiment the DSP 21 is operatively connected to the ASR/NLU 24, the programming. interface and the tagger 30. The ASR/NLU 24 calculates the number of words in the message by counting the text words found and feeds this number to the DSP 21 to divide by the time and assign a category before passing the voice message on to the audio indexer/prioritizer 34.

In a further alternative embodiment the DSP 21 calculates the volume of the voice message and assigns a category to the message according to whether the volume is above or below a threshold volume level programmable through the interface 38. The DSP 21 samples the voice message at typically several hundred times a second to acquire a series of sinusoidally varying volume levels. The DSP takes an average of the peak volume levels to calculate an average volume level for the whole or a portion of the voice message.

In addition to processing the call according to word rate, the system 10 may be further programmed by the user 12 to process an incoming telephone call based on the content and subject matter of the call or message and/or the time of day in which such call or message is received. Referring again to FIGS. 2 and 3, after receiving an incoming telephone call or e-mail or facsimile message, or after retrieving a recorded message from an answering machine or voice mail, the server 20 sends the call or message data to the ASR/NLU module 24. The ASR/NLU module 24 converts voice data into symbolic language or readable text. The ASR/NLU module 26 then analyzes the call or message data by utilizing a combination of speech recognition to extract certain keyword or topics and natural language understanding to determine the subject matter and content of the call (step 160 in FIG. 3).

Once the ASR/NLU module determines the subject matter of the call (step 170 in FIG. 3), a signal is then sent to the switching module 28 from the ASR/NLU module 24, wherein the call is processed in accordance with a pre-determined manner based on the subject matter and content of the call (step 158 in FIG. 3). For instance, if a call relates to an emergency or accident, the switching module 28 may be programmed to transfer the call immediately to a certain individual.

In the event that the ASR/NLU module 24 is unable to determine the subject matter or content of a telephone call, the ASR/NLU module 24 sends a signal to the speech synthesizer 36 which, in turn, sends a message to the server 20, to prompt the caller to articulate in a few words the reason for the call (step 180), e.g., "What is the reason for your call?" Again, it is to be understood that the system 10 may be programmed to initially prompt the caller to state the reason for the call.

If the system 10 is still unable to determine the subject matter of such call, the call may be processed in accordance with a pre-programmed procedure based on unknown matter (step 156).

Further, in the event that an incoming call is in a language foreign to the system 10 (i.e., foreign to the user), the ASR/NLU module 26 will signal the language identifier/translator module 26 to identify the particular language of the call or message, and then provide the required translation to the ASR/NLU module 26 so as to allow the system 10 to understand the call and answer the caller in the proper language. It is to be understood that the system 10 may also be pre-programmed to process calls or messages with an unknown language in a particular manner.

It is to be appreciated that any conventional technique for language identification and translation may be employed in the present invention, such as the well-known machine language identification technique disclosed in the article by Hieronymus J. and Kadambe S., "Robust Spoken Language Identification using Large Vocabulary Speech Recognition," Proceedings of ICASSP 97, Vol. 2 pp. 1111, as well as the language translation technique disclosed in Hutchins and Somers (1992): "An Introduction to Machine Translation," Academic Press, London; (encyclopedic overview).

It is to be understood that both speech recognition and natural language understanding may be utilized by the ASR/NLU module 24 to process data received from the server 20. The present invention preferably employs the natural language understanding techniques disclosed in IBM U.S. Pat. No. 5,991,710, filed on May 20, 1997, entitled: "A Statistical Translation System with Features Based on Phrases or Groups of Words," and U.S. Pat. No. 5,987,404, filed on Jan. 29, 1996 entitled "Statistical Natural Language Understanding Using Hidden Clumpings," the disclosures of which are incorporated herein by reference. The above-incorporated inventions concern natural language understanding techniques for parameterizing (i.e. converting) text input (using certain algorithms) into language which can be understood and processed by the system 10. For example, in the context of the present invention, the ASR component of the ASR/NLU module 24 supplies the NLU component of such module with unrestricted text input such as "Play the first message from Bob." Such text may be converted by the NLU component of the ASR/NLU module 24 into "retrieve-message(sender=Bob, message-number=1)." Such parameterized action can then be understood and acted upon by the system 10.

The known automatic speech recognition functions are disclosed in the article by Zeppenfeld, et al., entitled "Recognition of Conversational Telephone Speech Using The Janus Speech Engine," Proceedings of ICASSP 97, Vol. 3, pp. 1815 1997; and the known natural language understanding functions disclosed in the article by K. Shirai and S. Furui, entitled "Special Issue on Spoken Dialog," 15, (3–4) Speech Communication, 1994 may also be employed in the present invention. Further, to simplify the programming of the ASR/NLU module 24, the keyword spotting based recognition methods as disclosed in "Word Spotting from Continuous Speech Utterances," Richard C. Cross, Automatic Speech and Speaker Recognition, Advanced Topics, pp. 303–327, edited by Chin-Hui Lee, Frank K. Soong, Kuldip K. Paiwal (Huwer Academic Publishers), 1996 may preferably be used to guarantee that certain critical messages are sufficiently handled.

It is to be appreciated that by utilizing natural language understanding, as demonstrated above, the system 10 is capable of performing interactive voice response (IVR) functions so as to establish a dialog with the user or caller to provide dialog management and request understanding. This enables the system 10 to be utilized for order taking and dialog-based form filing. Further, such functions allow the caller to decide how to process the call (assuming the system 10 is programmed accordingly), i.e., by leaving an e-mail or voice mail message, sending a page or transferring the call to another telephone number. In addition, to be explained below, this allows the system 10 to be remotely programmed by the user through voice commands.

The process of programming the system 10 can be performed by a user either locally, via a GUI interface or voice commands, or remotely, over a telephone line (voice commands) or through a network system connected to the system. In either event, this is accomplished through the programming interface 38. As demonstrated above, programming the system 10 is achieved by, e.g., selecting the names of persons who should be transferred to a certain number, voice mail or answering machine, by inputting certain keywords or topics to be recognized by the system 10 as requiring certain processing procedures and/or by programming the system 10 to immediately connect emergency calls or business calls between the hours of 8:00 a.m. and 12:00 p.m. As shown in FIG. 2, the programming interface 38 sends such information to the server 20, speaker recognizer module 22, ASR/NLU module 26, language identifier/translator module 24, audio indexer/prioritizer module 34 and the switching module 28, which directs the system 10 to process calls in accordance with the user's programmed instructions.

It is to be appreciated that the system 10 may be programmed to manage various messages and calls received via voice-mails, telephone lines, facsimile/modem, e-mail and other telecommunication devices which are connected to the system 10 through the operation of the audio indexer/prioritizer module 34. In particular, the audio indexer/prioritizer module 34 may be programmed to automatically sort and index such messages and telephone conversations according to their urgency, importance or subject matter and content or origin. The system 10 can preferably be further programmed so as to prioritize certain calls and messages from a specific individual.

Referring to FIG. 2, the audio indexing feature of the system 10 works as follows. Once the caller is identified and verified by the speaker recognizer module 22, the speaker recognizer module 22 signals the tagger module 30 which automatically tags the identity of the caller or the identity of the current speaker of a group of participants to a teleconference. Simultaneously with the tagging process, the transcriber module 32 transcribes the telephone conversation or message. The tagging process involves associating the transcribed message with the identity of the caller or speaker. For instance, during teleconferences, each segment of the transcribed conversation corresponding to the current speaker is tagged with the identity of such speaker together with the begin time and end time for each such segment.

The information processed in the tagger module 30 and the transcriber module 32 is sent to the audio indexer/prioritizer module 34, wherein the received information is processed and stored according to a pre-programmed procedure. The audio indexer/prioritizer module 34 can be programmed to index the messages and conversations in any manner that the user desires. For instance, the user may be able to either retrieve the messages from a certain caller, retrieve all urgent messages, or retrieve the messages that relate to a specific matter. Further, the audio indexer/prioritizer module 34 can be programmed to prioritize calls from a caller who has either left numerous messages or has left urgent messages.

The information stored in the audio indexer/prioritizer module 34 can then be accessed and retrieved by the user either locally or remotely. A voice message may be played back to a user as selected based on the information stored in the audio indexer/prioritizer. Alternatively when such information is accessed by the user, the audio indexer/prioritizer module 34 sends the requested information to the speech synthesizer module 36, wherein a text-to-speech conversion is performed to allow the user to hear the message in the form of synthesized speech. It is to be understood that any conventional speech synthesizing technique may be utilized in the present invention such as the Eloquent engine provided with the commercially available IBM VIAVOICE-GOLD software.

It is to be appreciated that information may be retrieved from the audio indexer/prioritizer module 34 through various methods such as via GUI interface, PINs and DTMF keying. The preferred method in the present invention for retrieving such information, however, is through voice activated commands. Such method allows the system 10 to identify and verify the user before providing access to the messages or conversations stored and indexed in the audio indexer/prioritizer module 34. The audio indexer/prioritizer module 34 can be programmed to recognize and respond to certain voice commands of the user, which are processed by the ASR/NLU module 24 and sent to the audio indexer/prioritizer module 34, in order to retrieve certain messages and conversations. For example, the user may retrieve all the urgent and important messages that are stored in the audio indexer/prioritizer module 36 through a voice command, e.g., "Play all urgent messages". This command is received by the server 20 and sent to the ASR/NLU module 24 for processing. If the ASR/NLU module 24 understands the query, the ASR/NLU MODULE 24 sends a reply back to the server 20 to process the query. The server 20 then signals the indexer/prioritizer module 34 to send the requested messages to the speech synthesizer to generate synthesized e-mail or facsimile messages, or directly to the server 20 for recorded telephone or voice mail messages, which are simply played back.

It is to be appreciated that various alternative programming strategies to process calls may be employed in the present invention by one of ordinary skill in the art. For instance, the system 10 may be programmed to warn the user in the event of an important or urgent incoming telephone call. Specifically, the system 10 can be programmed to notify the user on a display thereby allowing the user to make his own decision on how to handle such call, or to simply process the call, as demonstrated above, in accordance with a pre-programmed procedure. Moreover, the system 10 can be programmed to forward an urgent or important call to the user's beeper when the user is not home or is out of the office. The user may also program the system 10 to dial a sequence of telephone numbers (after answering an incoming telephone call) at certain locations where the user may be found during the course of the day. Furthermore, the sequence (i.e., list) of pre-programmed telephone numbers may be automatically updated by the system 10 in accordance with the latest known location where the user is found. If the user desires, such list may also accessible by individuals who call into the system 10 so that such callers can attempt to contact the user at one of the various locations at their convenience.

In addition, it is to be appreciated that the system 10 may be programmed to store the names of all persons who call the system 10, together with their telephone numbers (using ANI), as well as e-mail addresses of persons who send electronic mail. This allows the user of the system 10 to automatically reply to pending calls or messages without having to first determine the telephone number or e-mail address of the person to whom the user is replying. Further, such programming provides for dynamically creating a continuously up-to-date address book which is accessible to an authorized user to send messages or make calls. Specifically, the user can access the system 10, select the name of a particular person to call, and then command the system 10 to send that person a certain message (e.g., e-mail or facsimile).

Although illustrative embodiments of the present invention have been described herein with reference to the accompanying drawings, it is to be understood that the invention is not limited to those precise embodiments, and that various other changes and modifications may be effected therein by one skilled in the art without departing from the true scope and spirit of the invention.

What is claimed is:

1. A method of processing a voice message within a messaging system comprising:
   receiving a voice-message;
   determining a characteristic associated with the acoustic delivery of the voice message;
   determining a category based on the characteristic;
   associating the category with the voice message; and
   prioritizing the voice message against other similarly categorised messages according to their respective categories.

2. The method as in claim 1 wherein the delivery characteristic is the ratio of the number of words in the voice message to the time taken to deliver the message.

3. The method as in claim 2 wherein the number of words is determined by counting the silent parts of the voice message.

4. The method as in claim 2 wherein the number of words is determined by counting the whole words in a text conversion of the voice message.

5. The method as in claim 1 wherein the delivery characteristic is the volume of the voice message.

6. The system for processing a voice message comprising:
   means for receiving a voice message;
   means for determining a characteristic associated with the acoustic delivery of the voice message;
   means for determing a category based on characteristic;
   means for associating the category with the voice message; and
   means for prioritising the voice message against other similarly categorised messages according to their respective categories.

7. The system as in claim 6 wherein the delivery characteristic is the ratio of the number of words in the voice message to the time taken to deliver the message.

8. The system as in claim 6 wherein the number of words is determined by counting the silent parts of the voice message.

9. The system in claim 6 wherein the number of words is determined by counting the whole words in a text conversion of the voice message.

10. The system as in claim 6 wherein the delivery characteristic is the volume of the voice message.

11. A machine readable storage, having stored thereon a computer program having a plurality of code sections executable by a machine for causing the machine to cause the steps of:
    receiving a voice message;
    determining a characteristic associated with the acoustic delivery of the voice message;
    determining a category based on the characteristic;
    associating the category with the voice message; and
    prioritizing the voice message against other similarly categorized messages according to their respective categories.

12. The machine readable storage according to claim 11, wherein the delivery characteristic is the ratio of the number of words in the voice message to the time taken to deliver the message.

13. The machine readable storage according to claim 12, wherein the number of words is determined by counting the silent parts of the voice message.

14. The machine readable storage according to claim 12, wherein the number of words is determined by counting the whole words in a text conversation of the voice message.

15. The machine readable storage according to claim 11, wherein the delivery characteristic is the volume of the voice message.

* * * * *